(12) United States Patent
Zhu et al.

(10) Patent No.: US 8,241,097 B2
(45) Date of Patent: Aug. 14, 2012

(54) ENVIRONMENTAL CONTROL SYSTEM AND METHOD FOR A BATTERY IN A VEHICLE

(75) Inventors: Douglas Zhu, Canton, MI (US); Patrick Maguire, Ann Arbor, MI (US); Bob Taenaka, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2205 days.

(21) Appl. No.: 10/906,671

(22) Filed: Mar. 1, 2005

(65) Prior Publication Data

US 2006/0033468 A1 Feb. 16, 2006

Related U.S. Application Data

(60) Provisional application No. 60/521,995, filed on Jul. 30, 2004.

(51) Int. Cl.
*H01M 10/50* (2006.01)
(52) U.S. Cl. .......................................... 454/139; 454/69
(58) Field of Classification Search .................... 454/69; 180/68.5; 429/99
See application file for complete search history.

(56) References Cited

U.S. PATENT DOCUMENTS

| | | | |
|---|---|---|---|
| 5,390,508 A | 2/1995 | Benedict | |
| 5,392,873 A | 2/1995 | Masuyama et al. | |
| 5,490,572 A * | 2/1996 | Tajiri et al. | 180/65.1 |
| 5,561,359 A | 10/1996 | Matsuura et al. | |
| 5,620,057 A | 4/1997 | Klemen et al. | |
| 5,937,664 A * | 8/1999 | Matsuno et al. | 62/259.2 |
| 6,315,069 B1 | 11/2001 | Suba et al. | |
| 6,444,353 B1 | 9/2002 | Takaki et al. | |
| 2002/0008404 A1* | 1/2002 | Mrozowski et al. | 296/146.2 |
| 2003/0047366 A1* | 3/2003 | Andrew et al. | 180/68.5 |
| 2004/0236537 A1* | 11/2004 | Eich et al. | 702/182 |

FOREIGN PATENT DOCUMENTS

| | | |
|---|---|---|
| JP | 04345773 A | 12/1992 |
| JP | 09289042 | 11/1997 |
| JP | 10284137 | 10/1998 |
| JP | 10306722 A | 11/1998 |
| JP | 11089009 A | 3/1999 |
| JP | 11122829 | 4/1999 |

(Continued)

OTHER PUBLICATIONS

Japanese Office Action, 5 pgs.

(Continued)

*Primary Examiner* — Steven B McAllister
*Assistant Examiner* — Samantha Miller
(74) *Attorney, Agent, or Firm* — David B. Kelley; Brooks Kushman P.C.

(57) ABSTRACT

An environmental control system for a battery in a vehicle includes an air intake for receiving ambient air from outside the vehicle. A duct system provides communication between the air intake and the battery. The duct system includes a movable door which can facilitate or inhibit movement of air between the air intake and the battery. An air outlet facilitates air flow from the duct system to the ambient environment outside the vehicle. A fan cooperates with the duct system for moving the air through a heat exchanger in the duct system and across the battery. A control system controls operation of the fan and the movable door, and is configured to determine whether the battery environment requires fresh air or recirculated air.

12 Claims, 8 Drawing Sheets

FOREIGN PATENT DOCUMENTS

| | | |
|---|---|---|
| JP | 11329517 A | 11/1999 |
| JP | 2001102100 A | 4/2001 |
| JP | 2001224105 A | 8/2001 |
| JP | 2002008614 | 1/2002 |
| JP | 2004001674 A | 1/2004 |
| JP | 2004047363 A | 2/2004 |
| JP | 2004146237 A | 5/2004 |
| JP | 2004161058 | 6/2004 |
| JP | 2004331306 A | 11/2004 |

OTHER PUBLICATIONS

Japanese Office Action dated Jun. 21, 2011, 4 pgs.

* cited by examiner

ENVIRONMENTAL CONTROL SYSTEM AND METHOD FOR A BATTERY IN A VEHICLE

CROSS-REFERENCE TO RELATED APPLICATIONS

This application claims the benefit of U.S. provisional Ser. No. 60/521,995 filed Jul. 30, 2004.

BACKGROUND OF THE INVENTION

1. Field of the Invention

The present invention relates to an environmental control system and method for a battery in a vehicle.

2. Background Art

Many hybrid electrical vehicles (HEV's) include a high voltage battery that is used to supply power to one or more electric machines. One or more of the electric machines may be operated as motors to help propel the vehicle, and may also be operated as generators, which can be used to charge the battery. Batteries, such as those used in HEV's, may require a cooling system to help ensure that their temperature does not get too high. In addition, it may be desirable to ventilate the environment around the battery.

A number of alternatives exist for providing cooling and/or ventilation to the environment around a battery. For example, air can be drawn from the passenger compartment of the vehicle to cool and/or ventilate the battery. This method may be less than ideal, however, since the air in a passenger compartment is often warm, and may not be cool enough to adequately reduce the temperature of the battery. In addition, if the air from the environment around the battery is recirculated into the passenger compartment, it may have an adverse effect on the passenger compartment air temperature, and thus, passenger comfort.

One alternative is to use fresh ambient air from outside the vehicle to both cool and ventilate the battery. This method may also be less than ideal, since the ambient air may be too warm to adequately cool the battery, or it may be so cold that it is desirable to raise its temperature before it is allowed to contact the hot battery. Moreover, when using ambient air from outside the vehicle, measures must be taken to inhibit the influx of dust, water and other foreign matter.

SUMMARY OF THE INVENTION

Accordingly, one advantage of the present invention is that it provides a method and system for controlling an environment for a battery in a vehicle that can use fresh air or recirculated air, and provides cooling and ventilation, while inhibiting the influx of foreign matter from outside the vehicle.

Another advantage of the present invention is that it provides a system and method for controlling doors in a cooling system to selectively allow or inhibit communication between the environment around the battery and the ambient environment outside the vehicle. The invention also provides selective control of at least one fan to help cool and ventilate the battery.

The invention also provides a method for controlling an environment for a battery in a vehicle. The method includes making a determination, independent of temperature, of whether the battery environment requires ventilation. The method also includes exchanging a least some air from around the battery with air from an ambient environment outside the vehicle when it is determined that the battery environment requires ventilation.

The invention further provides a method for controlling an environment for a battery in a vehicle. The vehicle includes a transmission and an air conditioning system for the battery. The method includes executing a first battery environment control strategy, including determining at least one vehicle operating condition. The battery environment is ventilated with air from an ambient environment outside the vehicle when the execution of the first battery environment control strategy indicates that the battery environment requires ventilation.

A second battery environment control strategy is executed when the first battery environment control strategy does not indicate that the battery environment requires ventilation. The second battery environment control strategy includes at least one of determining a current transmission gear and determining whether the battery air conditioning system is operating. Air is recirculated around the battery when the second battery environment control strategy indicates that exchange of air from around the battery with air from the ambient environment outside the vehicle should be inhibited.

A third battery environment control strategy is executed when the second battery environment control strategy does not indicate that the exchange of air from around the battery with air from the ambient environment outside the vehicle should be inhibited. Execution of the third battery environment control strategy includes determining a temperature of the battery and a temperature of the ambient environment outside the vehicle, and effecting a battery environment control based at least in part on the temperature of the battery and the temperature of the ambient environment outside the vehicle.

The invention also provides an environmental control system for a battery in a vehicle. The system includes an air intake for receiving air from an ambient environment outside the vehicle. A duct system is capable of providing communication between the air intake and the battery. The duct system includes a first door movable between a first position for facilitating movement of air between the air intake and the battery, and a second position for inhibiting movement of air between the air intake and the battery. An outlet is configured to facilitate air flow from the duct system to the ambient environment outside the vehicle. A fan cooperates with the duct system for moving air through at least a portion of the duct system and across the battery. A control system, including at least one controller, is configured to control operation of the fan and the first door, and to determine whether the battery environment requires ventilation. The control system is further configured to command the first door into the first position and to operate the fan, thereby moving air in through the air intake, across the battery, and out through the air outlet when it is determined that the battery environment requires ventilation.

The control strategy for the door or doors described below can optimize cooling effectiveness by operating the system in a fresh air mode to use ambient air for cooling or ventilation purposes, and by operating the system in a recirculation mode when battery air conditioning (A/C) is in use. In a cold ambient environment, fresh air may be the exclusive source of battery cooling. In a mild ambient environment, fresh air is used prior to battery A/C cooling to reduce the impact of A/C usage on fuel economy. In a hot ambient environment, fresh air may be used for ventilation only, and battery A/C is the primary source for cooling; therefore, the door is closed and the system operated in a recirculation mode except when ventilation is needed. The door control strategy is also used to reduce the risk of dust and water ingestion when the transmission gear is in park or neutral, or after vehicle is keyed-off, except when ventilation is in process.

The fan control strategy turns on the fan or fans whenever battery cooling (A/C or fresh air) or ventilation is needed. It also enables one or more fans to be on when the system is in the recirculation mode, even in a low temperature ambient environment. In such a case, an evaporator core may already be cold, without the battery A/C being operated. Therefore, one or more fans are operated and the air recirculated to take advantage of the cold evaporator core and low temperature air in the ducts around the evaporator core.

An appropriate hysteresis or time delay can be used for each mode change (door control, fan control, ventilation control) to prevent the door and fan from oscillating between two modes. This can help reduce any negative impact on the door and fan component life, and may increase the cooling effectiveness, since the residual cooling capacity of the evaporator core and air in the system ducts is utilized. The control strategy can also filter out short and transient gear changes when the vehicle operator switches gears.

The control strategy can determine if ventilation is needed based on battery conditions, and then switch to the fresh air mode with the fan on if ventilation is needed. The control strategy can also determine if ventilation is needed when the vehicle is keyed-off. If ventilation is not needed, the door can be closed to put the system in the recirculation mode and the fan can be turned off before a battery control module (BCM) is powered off. If ventilation is needed, the door will be opened to put the system in the fresh air mode, and the fan will be turned on for a fixed period before the BCM is powered off. After completion of the ventilation, the door will be closed to change the system to the recirculation mode, and the fan will be turned off.

The door and fan control strategy can be used to: 1) provide battery cooling in a cold ambient environment when battery A/C is not used; 2) optimize fuel economy and battery performance by reducing battery A/C and fan usage, and by preventing the battery from operating in high temperature ranges where charge and discharge powers are reduced; and 3) reduce the risk of water ingestion during car washes by closing the door or doors to put the system in the recirculation mode when the vehicle is in park, neutral, or after the vehicle is keyed-off.

DETAILED DESCRIPTION OF THE PREFERRED EMBODIMENT(S)

Figure 1:
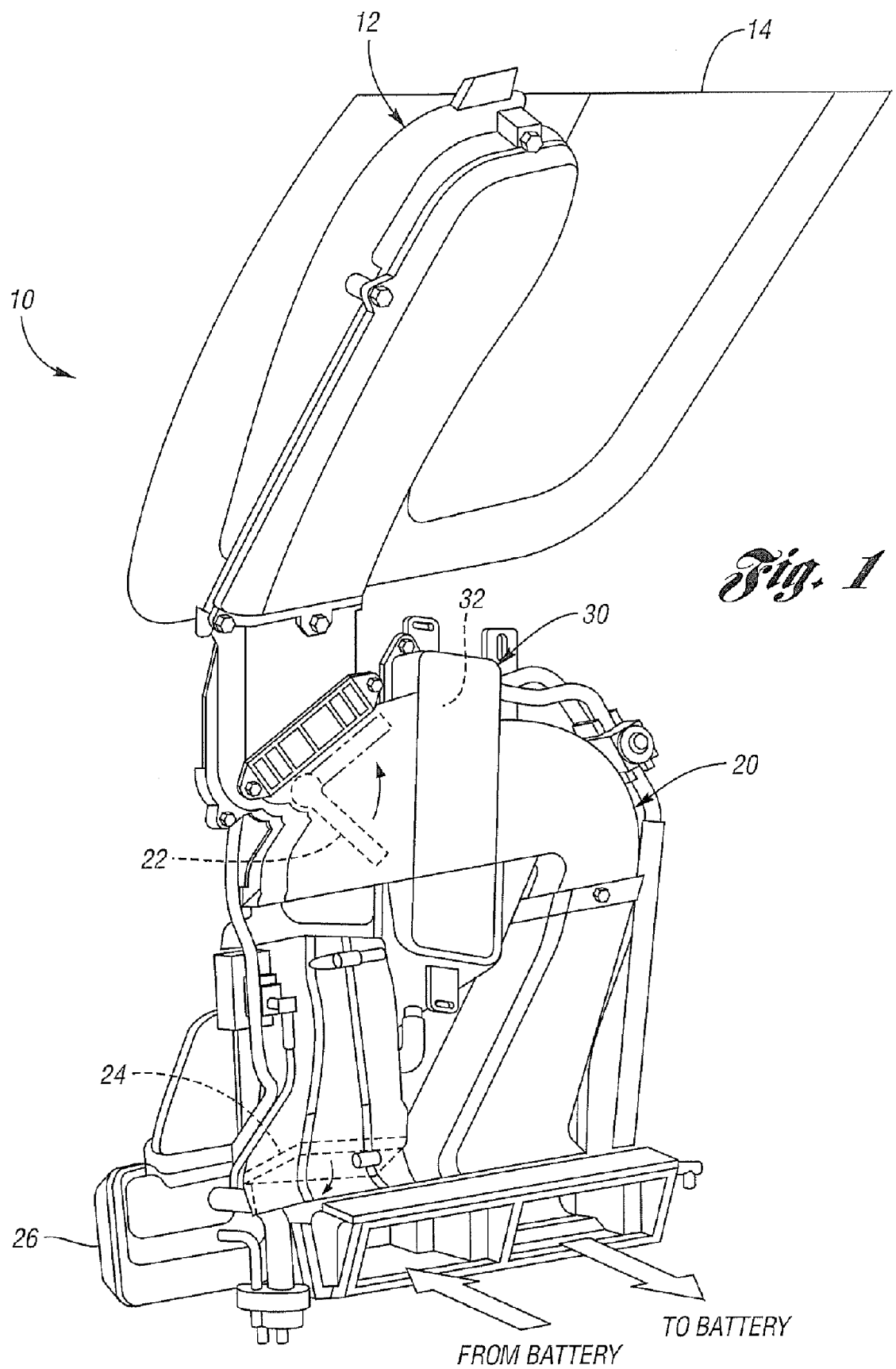
FIG. 1 is a perspective view of an environmental control system for a battery in accordance with the present invention.
Figure 2:
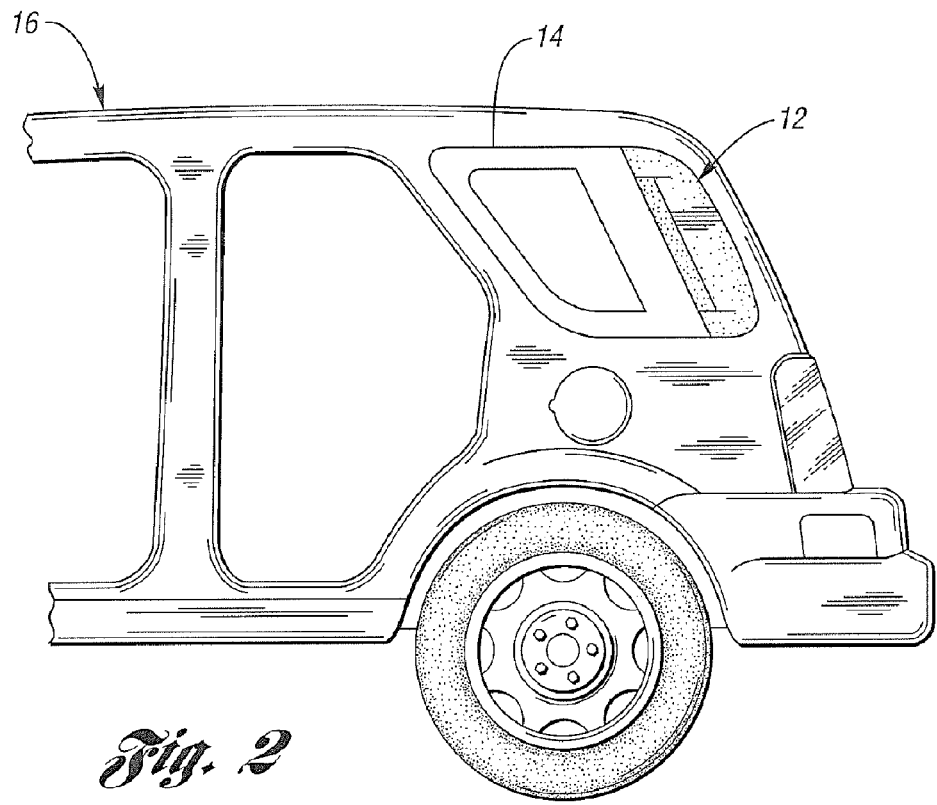
FIG. 2 is a fragmentary side view of a portion of a vehicle including a portion of the environmental control system shown in FIG. 1.

FIG. 1 shows a portion of an environmental control system 10 for a battery in accordance with the present invention. The environmental control system 10 includes an air intake 12 that is disposed in a vehicle window 14. FIG. 2 shows a portion of a vehicle 16, including the window 14 and the air intake 12. The air intake 12 is configured to receive air from an ambient environment outside the vehicle 16, while inhibiting the intake of water and debris. One such air intake is described in U.S. patent application Ser. No. 10/605,182, filed on Sep. 12, 2003, now U.S. Pat. No. 7,044,848, which is hereby incorporated herein by reference.

Figure 3:
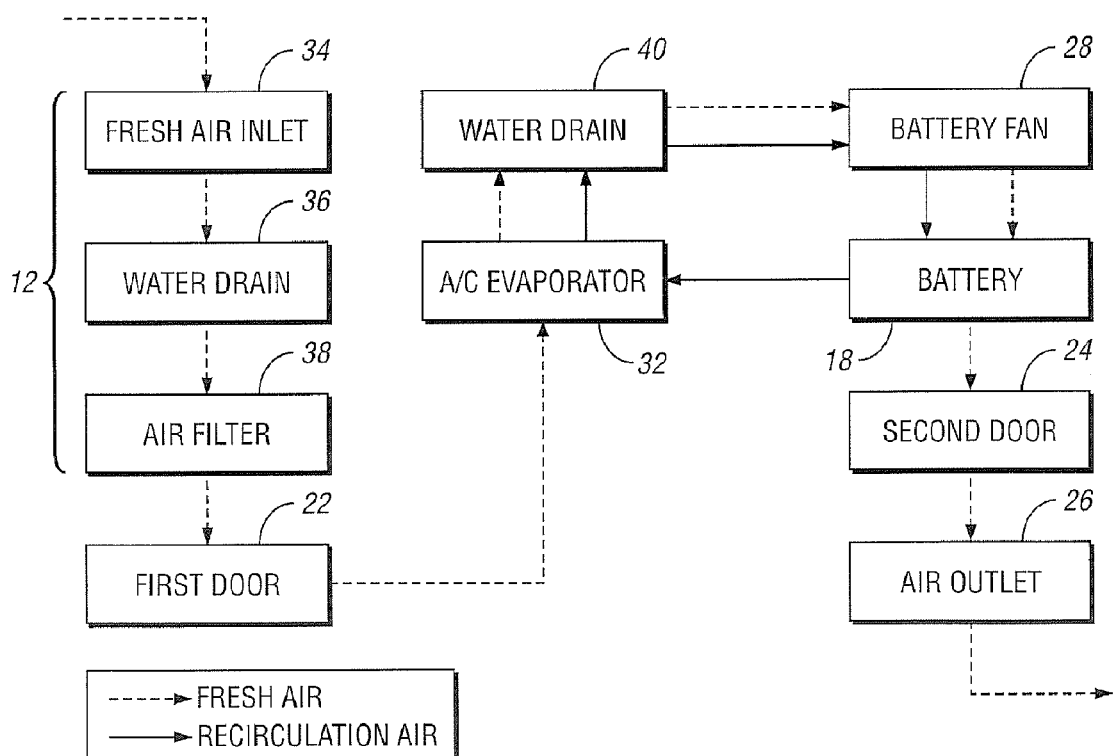
FIG. 3 is a schematic diagram illustrating a portion of the environmental control system shown in FIG. 1.

The environmental control system 10 is specifically configured to control the environment around a battery 18, which is illustrated schematically in FIG. 3. A duct system 20, shown in FIG. 1, provides communication between the air intake 12 and the battery 18. The duct system 20 includes a first door 22 that is movable between a first position and a second position (movement of the first door 22 from the first position to the second position is indicated by the direction arrow in FIG. 1).

When the first door 22 is in the first position, it facilitates movement of air between the air intake 12 and the battery 18. Conversely, when the first door 22 is in the second position, it inhibits movement of air between the air intake 12 and the battery 18. The duct system 20 also includes a second door 24 that is movable between a first position and a second position. Movement of the second door 24 from the first position to the second position is indicated by the direction arrow as shown in FIG. 1. When the second door 24 is in the first position, it facilitates movement of air from the battery 18 to an air outlet 26. The air outlet 26 is configured to facilitate air flow from the duct system 18 to the ambient environment outside the vehicle. When the second door 24 is in the second position, it inhibits the movement of air between the battery 18 and the air outlet 26. A fan 28, shown schematically in FIG. 3, cooperates with the duct system 20 for moving air through the duct system 20 and across the battery 18.

The vehicle 16 also includes a battery air conditioning system 30, shown in FIG. 1. The battery air conditioning system 30 includes an evaporator coil 32 disposed within the duct system 20 to cool the air as it flows through it. The evaporator coil 32 is also shown schematically in FIG. 3, as are a number of the other elements of the vehicle 16 and the environmental control system 10.

As shown in FIG. 3, the air intake 12 includes three separate elements: a fresh air inlet 34, which is where the air enters the duct system 30 from outside the vehicle 16, a water drain 36, and an air filter 38. A second water drain 40 is also shown in FIG. 3 downstream from the evaporator coil 32. The water drain 40 is located inside the duct system 20, and provides an outlet for any condensation which may occur as the air passing over the evaporator coil 32 cools.

FIG. 3 also shows air flow paths for fresh air—shown as a dotted line—and for recirculated air-shown as a solid line. As shown in FIG. 3, fresh air enters the fresh air inlet 34, being pulled in by the battery fan 28. The battery fan 28 blows the air across the battery 18 and through the air outlet 26 to the ambient environment outside the vehicle 16. As discussed more fully below, it may be desirable in some situations to recirculate the air around the battery 18, rather than drawing in fresh air from the ambient environment. In such situations, the fan 28 blows air across the battery 18, which then passes back through the evaporator coil 32 and is again blown across the battery 18 by the fan 28.

Figure 4:
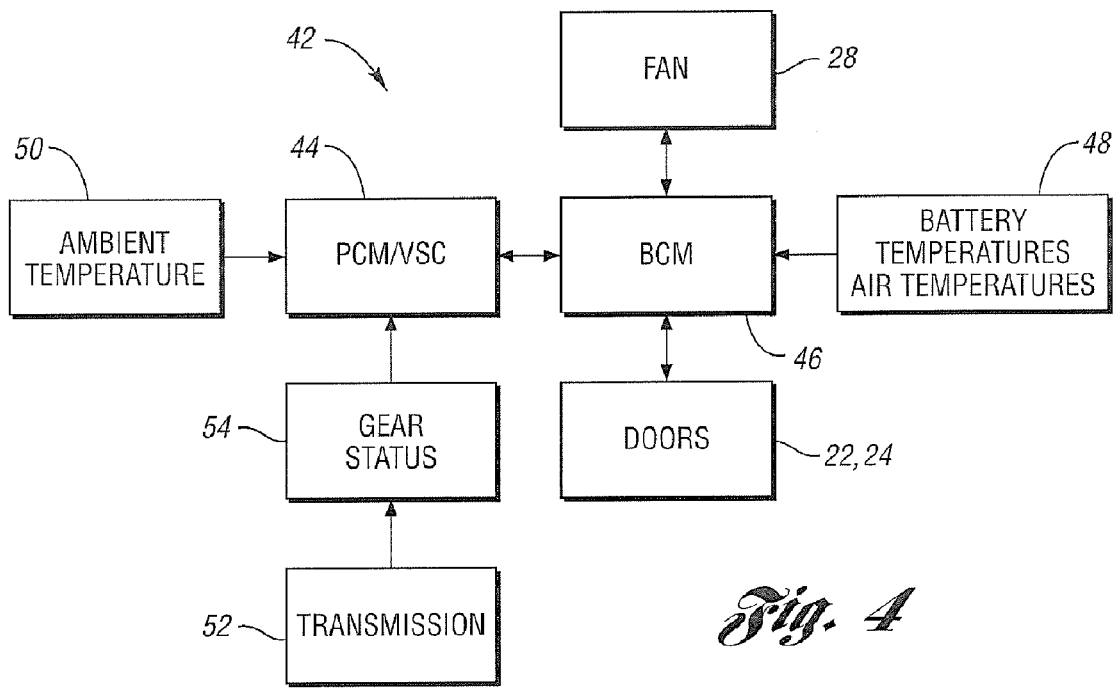
FIG. 4 is a schematic diagram showing door and fan control interfaces in accordance with the present invention.

FIG. 4 shows a schematic representation of the control interfaces for the first and second doors 22, 24 and the fan 28. In FIG. 4 it is shown that the environmental control system 10 also includes a control system, shown generally at 42. In the embodiment shown in FIG. 4, the control system 42 includes two separate controllers, a powertrain control module/vehicle system controller (PCM/VSC) 44 and a battery control module (BCM) 46. As described more fully below in conjunction with the operation of the environmental control system 10, the BCM 46 receives inputs from a number of sensors, shown generally at 48. The sensors 48 include at least one battery temperature sensor and at least one sensor for detecting the temperature of the air surrounding the battery 18. The BCM 46 also receives inputs from the fan 28, which may include such parameters as fan speed. The BCM also receives inputs from the doors 22, 24, which may include inputs from position sensors indicating the positions of the doors 22, 24.

The PCM/VSC 44 receives inputs from at least one sensor 50 indicating the temperature of the ambient air outside the vehicle 16. As shown in FIG. 4, the vehicle 16 also includes a transmission 52. A sensor 54 determines the transmission gear and communicates this information to the PCM/VSC 44. Although the sensor 54 is shown communicating directly with the transmission 52, it is understood that such a sensor may determine the transmission gear based on, for example, the position of a gear shift lever. The PCM/VSC 44 communicates information to the BCM 46, which uses some or all of these inputs to determine the position of the first and second doors 22, 24, and to determine operation of the fan 28.

Figure 5:
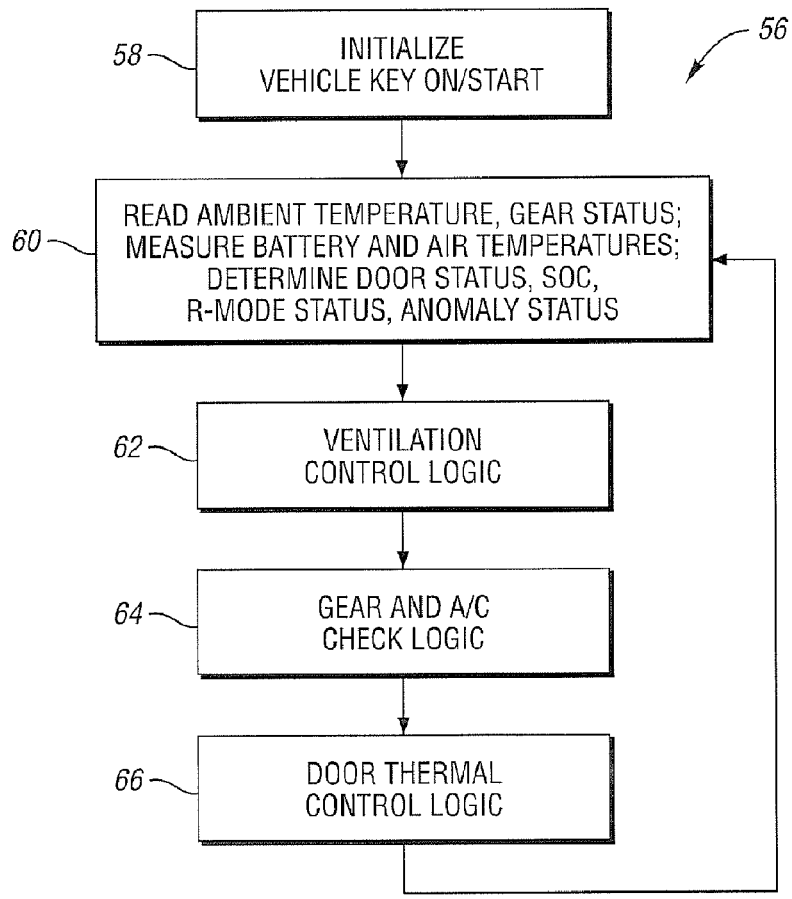
FIG. 5 is a flowchart illustrating a battery environmental control system logic in accordance with the present invention.

FIG. 5 shows an overall battery environmental control system logic which, for example, may reside as software in one or more of the controllers 44, 46 in the battery environmental control system 10. The battery environmental control system logic is shown in FIG. 5 in the form of a flowchart 56. The control system logic is initialized at step 58, with a vehicle key-on or start command.

At step 60, various parameters are determined including the temperature of the ambient air, the current transmission gear status, the battery temperature, the battery air temperature, the door status, and the battery state of charge (SOC). Also determined at step 60 is whether the battery 16 is in a reconditioning mode (R-mode). The actual processes involved in a battery reconditioning mode are known to those in the art, and are not enumerated here. For purposes of the present invention, it is enough to determine if the battery 16 is in a reconditioning mode; this may be indicated, for example, by a high battery SOC.

At step 60, it is further determined whether any anomalies—e.g., voltage deviations, current sensor anomalies, or battery cell anomalies—exist within the battery 16. Although each of the determinations in step 60 is shown in a single step, it is understood that these determinations could be performed in any sequence effective to allow an environmental control system, such as the environmental control system 10, to control the environment of a battery. Moreover, one or more of the determinations shown in step 60 could take place simultaneously.

After the determinations are made, the environmental control system logic executes a first battery environment control strategy, shown in step 62 as "ventilation control logic". Depending on the outcome of the ventilation control logic, the battery environmental control system logic may then execute a second battery environment control strategy, shown at step 64 as "gear and A/C check logic". Again depending on the outcome of the gear and A/C check logic, the battery environmental control system logic may then execute a third battery environment control strategy, shown at step 66 as "door control logic". As shown in FIG. 5, the control system logic may then loop back to step 60 where the various parameters, including vehicle operating conditions, are determined.

Figure 6:
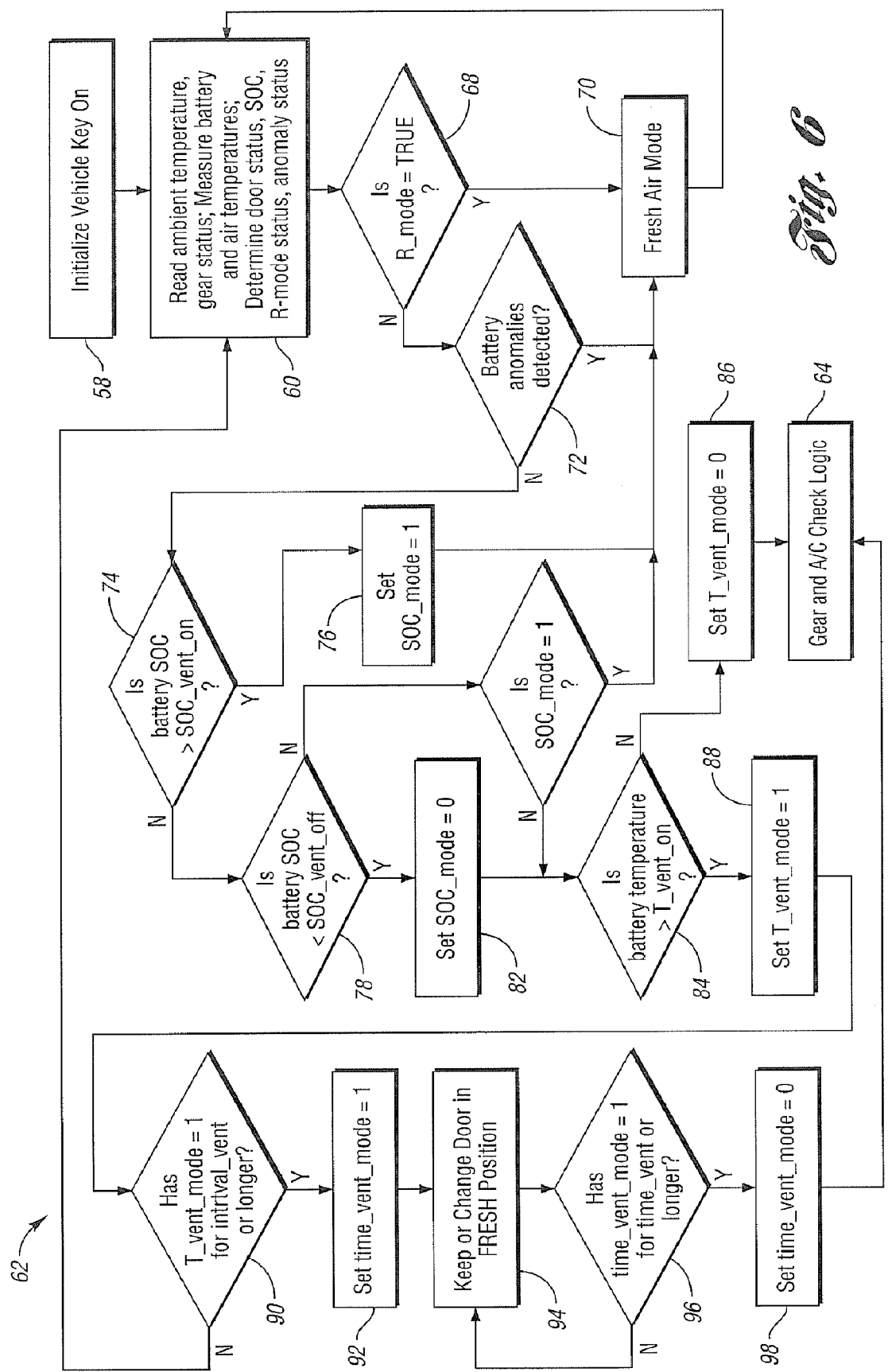
FIG. 6 is a flowchart illustrating ventilation control logic in accordance with the present invention.
Figure 7:
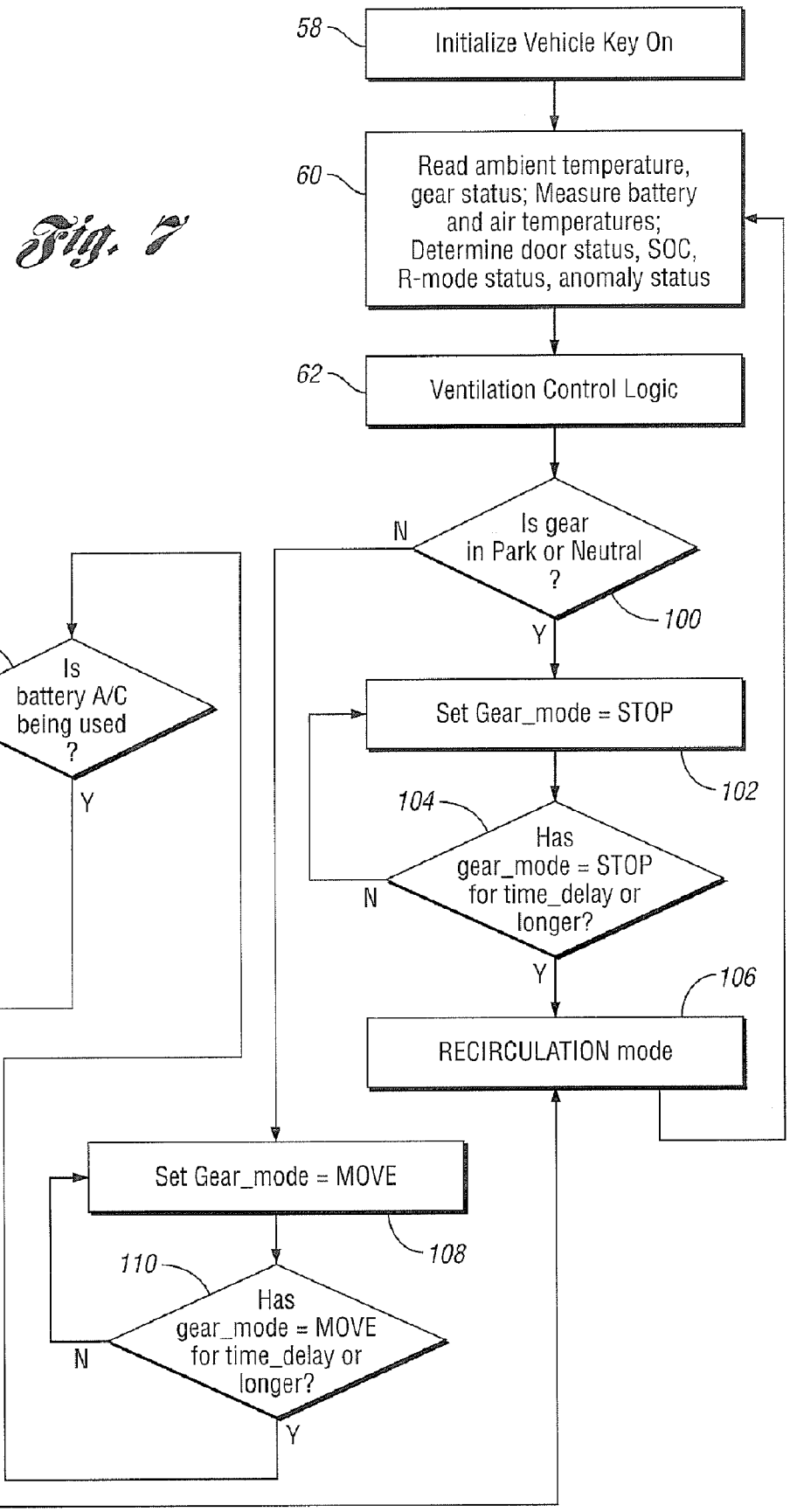
FIG. 7 is a flowchart illustrating gear and A/C check logic in accordance with the present invention.
Figure 8:
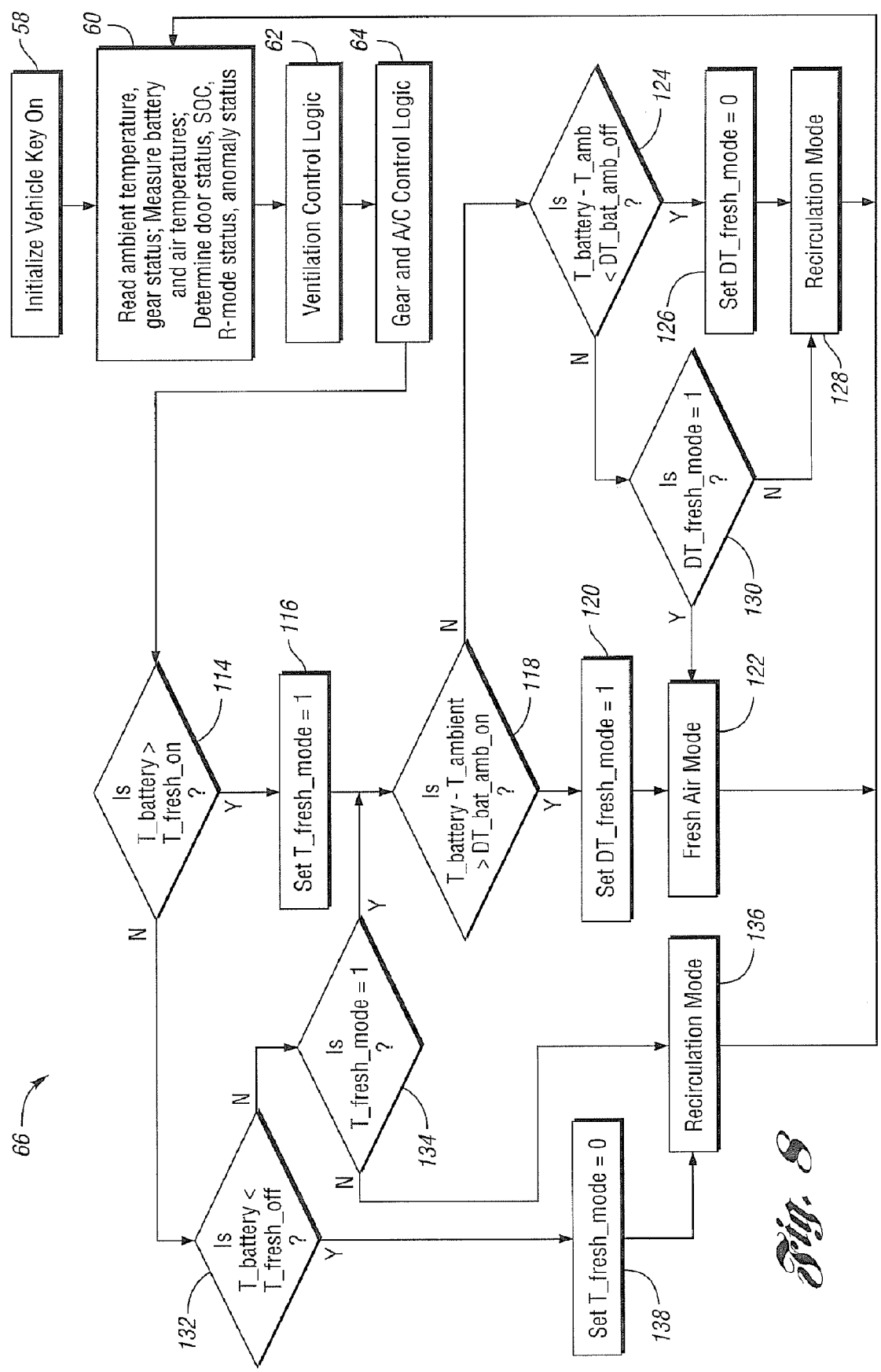
FIG. 8 is a flowchart illustrating door control logic in accordance with the present invention.

Steps 62, 64, 66, shown in FIG. 5, are illustrated in detail in FIG. 6, FIG. 7, and FIG. 8, respectively. Each is now discussed in detail. FIG. 6 shows the ventilation control logic, illustrated at step 62 in FIG. 5. As described below, the first portion of the ventilation control logic 62 includes a determination, independent of temperature, of whether the battery environment requires ventilation. Such a determination may be useful depending on the type of battery used in a vehicle. For example, a lead-acid battery, commonly used in conventional vehicles, can emit a small quantity of gas which can form near the surface of the battery. If such gas is allowed to condense, it may negatively impact the battery surface. Therefore, ventilation of the battery environment may be desirable, completely independent of the temperature of the battery, and/or independent of the temperature of the ambient air outside the vehicle.

The determination of whether the battery environment requires ventilation may include such things as determining whether the battery is in a reconditioning state (R-mode). This determination (R_mode=TRUE) is made at decision block 86. As shown in FIG. 6, if it is determined that the battery is in a reconditioning state, the battery environmental control system 10 is placed in a fresh air mode—see step 70. In the fresh air mode, at least some of the air from around the battery 18 is exchanged with air from the ambient environment outside the vehicle 16. To facilitate the fresh air mode, the BCM 44 commands the first and second doors 22, 24 into their respective first positions, and operates the fan 28, thereby moving air from the ambient environment in through the air intake 12, across the battery 18, and out through the air outlet 26. In this way, at least some of the air previously around the battery is exchanged with outside ambient air.

If, at decision block 68, it is determined that the battery 18 is not in a reconditioning state, it is next determined at decision block 72 whether certain anomalies exist within the battery 18. Anomalies may include such things as a voltage deviation, a current sensor anomaly, or an anomaly within an individual cell of the battery 18. If one or more of these anomalies are found to exist, the environmental control system 10 is again placed in the fresh air mode. The BCM 44 can be programmed as desired such that only certain anomalies, or a certain combination of anomalies, cause the environmental control system 10 to be placed in the fresh air mode.

If, at decision block 72, it is determined that certain anomalies do not exist, it is then determined at decision block 74 whether the battery SOC is greater than a first determined charge level (SOC-vent-on). If it is, an SOC flag is turned on at step 76 (SOC_mode=1), and the environmental control system 10 is placed in the fresh air mode. If, however, the battery SOC is not greater than the first predetermined charge level, it is then determined at decision block 78 whether the battery SOC is less than a second predetermined charge level (SOC_vent_off). The second predetermined charge level is set lower than the first predetermined charge level, to provide a hysteresis between the two predetermined charge levels. This helps to ensure that the environmental control system 10 will not rapidly fluctuate between the fresh air mode and a recirculation mode, discussed below.

If, at decision block 78, it is determined that the battery SOC is not less than the second predetermined charge level, it is then determined at decision block 80 whether the SOC flag has been turned on. If it has, the environmental control system 10 is put in the fresh air mode, if not, the ventilation control logic 62 continues. If, at decision block 78, it is determined that the battery SOC is less than the second predetermined charge level the SOC flag is turned off (SOC_mode=0) at step 82. When the SOC flag is turned off, the exchange of air from around the battery 18 with air from the ambient environment outside the vehicle 16 is unnecessary.

The ventilation control logic 62 continues at decision block 84, where it is determined whether the battery temperature is greater than a battery ventilation temperature (T_vent_on). If not, a temperature based ventilation flag is turned off at step 86 (T_vent_mode=0). If, however, the battery temperature is greater than the ventilation temperature, the temperature based ventilation flag is turned on at step 88 (T_vent_mode=1). It is next determined at decision block 90 whether the temperature based ventilation flag has been turned on at least as long as some predetermined interval (interval_vent). If not, the ventilation control logic 62 loops back to step 60. If, however, the temperature based ventilation flag has been on for at least as long as the predetermined interval, a time based ventilation flag is turned on at step 92 (time_vent_mode=1).

At step 94, the ventilation control logic 62 adjusts or maintains the position of the first and second doors 22, 24, to keep the environmental control system 10 in the fresh air mode. It is next determined at decision block 96 whether the time based ventilation flag has been on for at least as long as some predetermined time (time_vent). If not, the ventilation control logic 62 loops backs to step 94. If it has, the time based ventilation flag is turned off at step 98 (time_vent_mode=0). As shown in FIG. 6, when either the temperature based ventilation flag or the time based ventilation flag is turned off, the ventilation control logic 62 exits to the gear and A/C check logic 64.

FIG. 7 shows the gear and A/C check logic 64 in detail. As shown in FIG. 7, the gear and A/C check logic begins at decision block 100, where it is determined whether the transmission 52 is in a park or neutral gear. If the transmission gear is park or neutral, a gear mode flag is turned off at step 102 (Gear_mode=STOP). It is next determined at decision block 104 whether the gear mode flag has been off for some predetermined time (time_delay). If not, the gear and A/C check logic 64 loops back to step 102. If the gear mode flag has been off for at least as long as the predetermined time, the environmental control system 10 is placed in the recirculation mode at step 106. Automatically placing the environmental control system 10 in the recirculation mode when the transmission is in park or neutral helps to ensure that water will not enter the vehicle 16 through the air intake 12 or the air outlet 26. Such undesirable water intake could occur, for example, while the vehicle 16 is being washed.

In the recirculation mode, exchange of air from around the battery 18 with air from the ambient environment outside the vehicle 16 is inhibited. Referring to FIG. 1, placing the environmental control system 10 in the recirculation mode includes placing the first and second doors 22, 24 in their respective second positions. This facilitates the recirculation of air from the battery 18, through the evaporator coil 32 in the duct system 20, and back to the battery 18. This is illustrated schematically in FIG. 3.

Returning to FIG. 7, if it is determined at decision block 100 that the transmission 52 is not in park or neutral—i.e., the transmission is in a forward or reverse gear—the gear mode flag is turned on at step 108 (Gear_mode=MOVE). If it is determined at decision block 110 that the gear mode flag has not been on for the predetermined time, the method loops back to step 108. Conversely, if it is determined that the gear mode flag has been turned on for the predetermined time, it is then determined at decision block 112 whether the battery air conditioning system 30 is being used. If it is, the environmental control system is placed in the recirculation mode at step 106. If the battery air condition system 30 is not being used, the gear and A/C check logic 64 exits to the door control logic 66.

Turning to FIG. 8, the door logic 66 begins at decision block 114, where it is determined whether the temperature of the battery (T_battery) is greater than some predetermined temperature (T_fresh_on). If it is, a temperature based flag is turned on at step 116 (T_fresh_mode=1). From there, a temperature difference is determined at decision block 118. The temperature difference is the difference between the temperature of the battery 18 and the temperature of the ambient air outside the vehicle 16 (T_ambient). It is then determined whether this temperature difference is greater than a second predetermined temperature (DT_bat_amb_on). If it is, a differential temperature flag is turned on at step 120 (DT_fresh_mode=1). The environmental control system 10 is then placed in the fresh air mode at step 122.

If, at decision block 118, it is determined that the temperature difference is not greater than the second predetermined temperature, it is then determined at decision block 124 whether the temperature difference is less than a third predetermined temperature (DT_bat_amb_off). The second and third predetermined temperatures, used respectively in decision blocks 118 and 124, are not equal; this provides a hysteresis in the operation of the environmental control system 10. This helps to keep the environmental control system 10 from fluctuating between the fresh air mode and the recirculation mode when the temperature of the battery 18 and/or the temperature of the ambient environment outside the vehicle 16 fluctuates.

If, at decision block 124, it is determined that the temperature difference is less than the third predetermined temperature, the temperature differential flag is turned off at step 126 (DT_fresh_mode=0), and the environmental control system 10 is placed in the recirculation mode at step 128. Conversely, if the temperature difference is less than the third predetermined temperature, it is then determined at decision block 130 whether the temperature differential flag is already turned on. If it is, the environmental control system 10 is placed in the fresh air mode at step 122; if it is not, the environmental control system 10 is placed in the recirculation mode at step 128.

Returning to decision block 114, if the temperature of the battery is not greater than the first predetermined temperature, the door control logic 66 proceeds to decision block 132 to determine if the temperature of the battery is less than a fourth predetermined temperature. As with the second and third predetermined temperatures, the first and fourth predetermined temperatures, used respectively in decision blocks 114 and 132, are not equal to each other. This provides hysteresis for the environmental control system 10.

If, at decision block 132, it is determined that the temperature of the battery 18 is not less than the fourth predetermined temperature, it is then determined at decision block 134 whether the temperature based flag has already been turned on. If it has, the door control logic 66 proceeds to decision block 118; if it has not, the environmental control system 10 is placed in the recirculation mode at step 136. Returning to decision block 132, if the temperature of the battery 18 is less than the fourth predetermined temperature, the temperature based flag is turned off at step 138 (T_fresh_mode=0), and the environmental control system 10 is placed in the recirculation mode at step 136.

Figure 9:
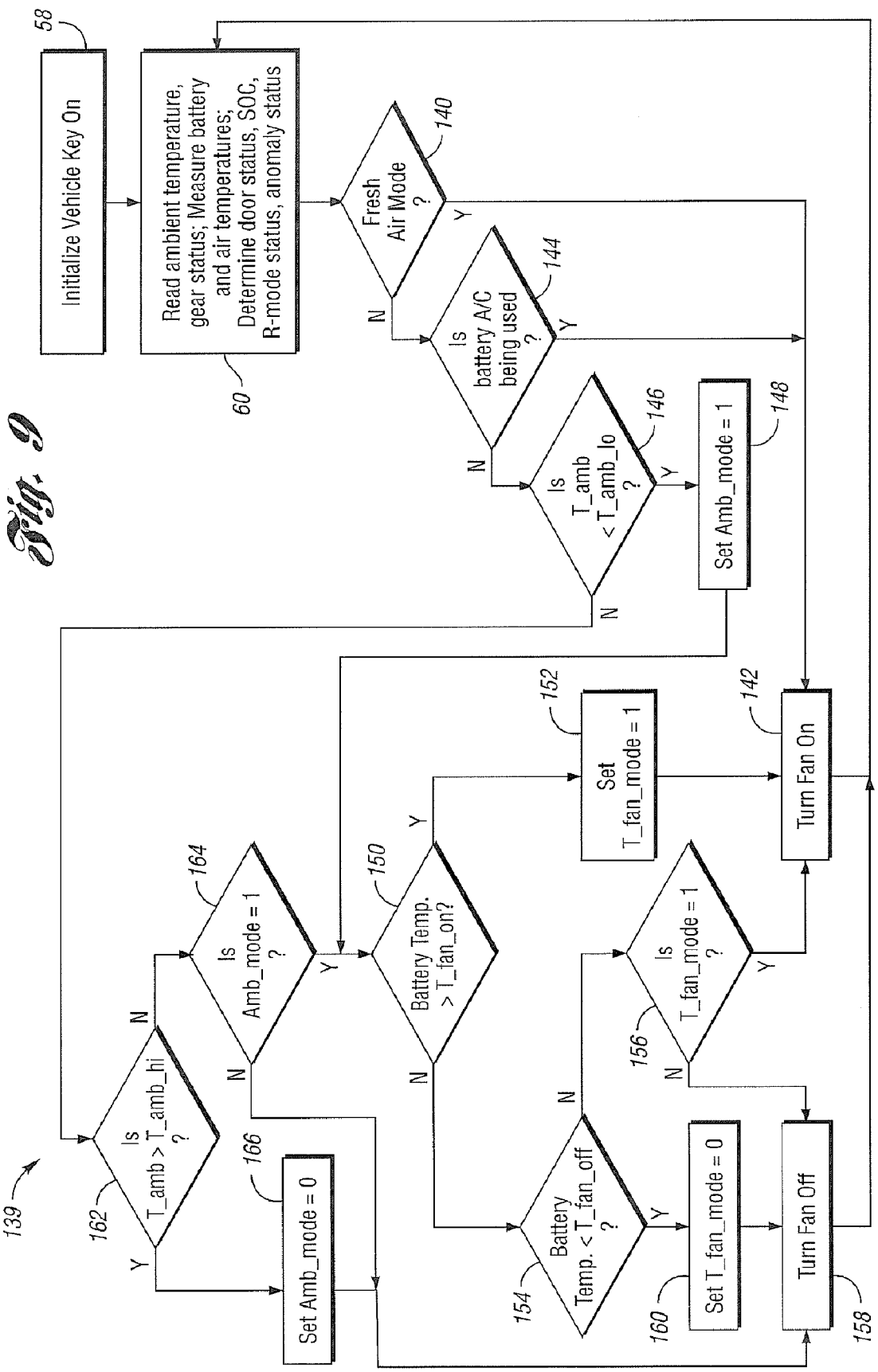
FIG. 9 is a flowchart illustrating fan control logic in accordance with the present invention.

FIG. 9 shows fan control logic 139 that can be used to optimize use of a fan in a battery environmental control system, such as the fan 28 in the environmental control system 10. After execution of steps 58 and 60, the fan control logic is shown in FIG. 9 beginning at decision block 140, where it is determined whether environmental control system 10 is in the fresh air mode. If it is, the fan is turned on at step 142. If it is not, it is next determined at decision block 144 whether the battery air conditioning system 30 is being used. If it is, the fan is turned on at step 142.

If, at decision block 144, it is determined that the battery air conditioning system 30 is not being used, it is next determined at decision block 146 whether the temperature of the ambient air outside the vehicle 16 (T_amb) is less than some low limit (T_amb_lo). If it is, an ambient temperature flag is turned on at step 148 (Amb_mode=1). From there, it is determined whether the temperature of the battery 18 is greater than a predetermined temperature for turning on the fan 28—see decision block 150. If it is, a fan temperature flag is turned on at step 152 (T_fan_mode=1), and the fan 28 is turned on at step 142. If, at decision block 150, it is determined that the temperature of the battery 18 is not greater than the temperature required to turn the fan on (T_fan_on), the fan control logic moves to decision block 154.

At decision block 154, it is determined whether the temperature of the battery 18 is less than a predetermined temperature required to turn off the fan 28 (T_fan_off). If not, it is then determined at decision block 156 whether the fan temperature flag has already been turned on. If it has, the fan 28 is turned on at step 142. If not, the fan 28 is turned off at step 158. If, at decision block 154, it is determined that the temperature of the battery is less than the temperature required to turn off the fan 28, the fan temperature flag is turned off at step 160 (T_fan_mode=0), and the fan 28 is turned off at step 158.

Returning to decision block 146, if the temperature of the ambient air is not less than the lower limit, the fan control logic moves to decision block 162, where it is determined if the temperature of the ambient air is greater than some high limit (T_amb_hi). If not, it is determined at decision block 164 whether the ambient temperature flag has already been turned on. If it has, the fan control logic moves to decision block 150. If it has not, the fan 28 is turned off at step 158. If, however, at decision block 162, it is determined that the ambient temperature is greater than the high temperature limit, the ambient temperature flag is turned off at step 166 (Amb_mode=0), and the fan 28 is turned off at step 158.

Examining decision blocks 150 and 154 in FIG. 9, it is shown that the fan control logic effectively determines whether the temperature of the battery 18 is within some predetermined temperature range. In particular, this predetermined temperature range is bounded on the high side by the temperature necessary to turn on the fan 28 (T_fan_on), shown in decision block 150, and it is bounded on the low side by the temperature required to turn off the fan 28 (T_fan_off), shown in decision block 154. If the temperature of the battery is within this range, the fan 28 will be turned off at step 158, unless the fan temperature flag has been turned on for some other reason—see decision block 156. Thus, the fan control logic shown in FIG. 9 helps to ensure that the fan 28 is turned on when required, and it is turned off when not required, thereby saving energy.

Figure 10:
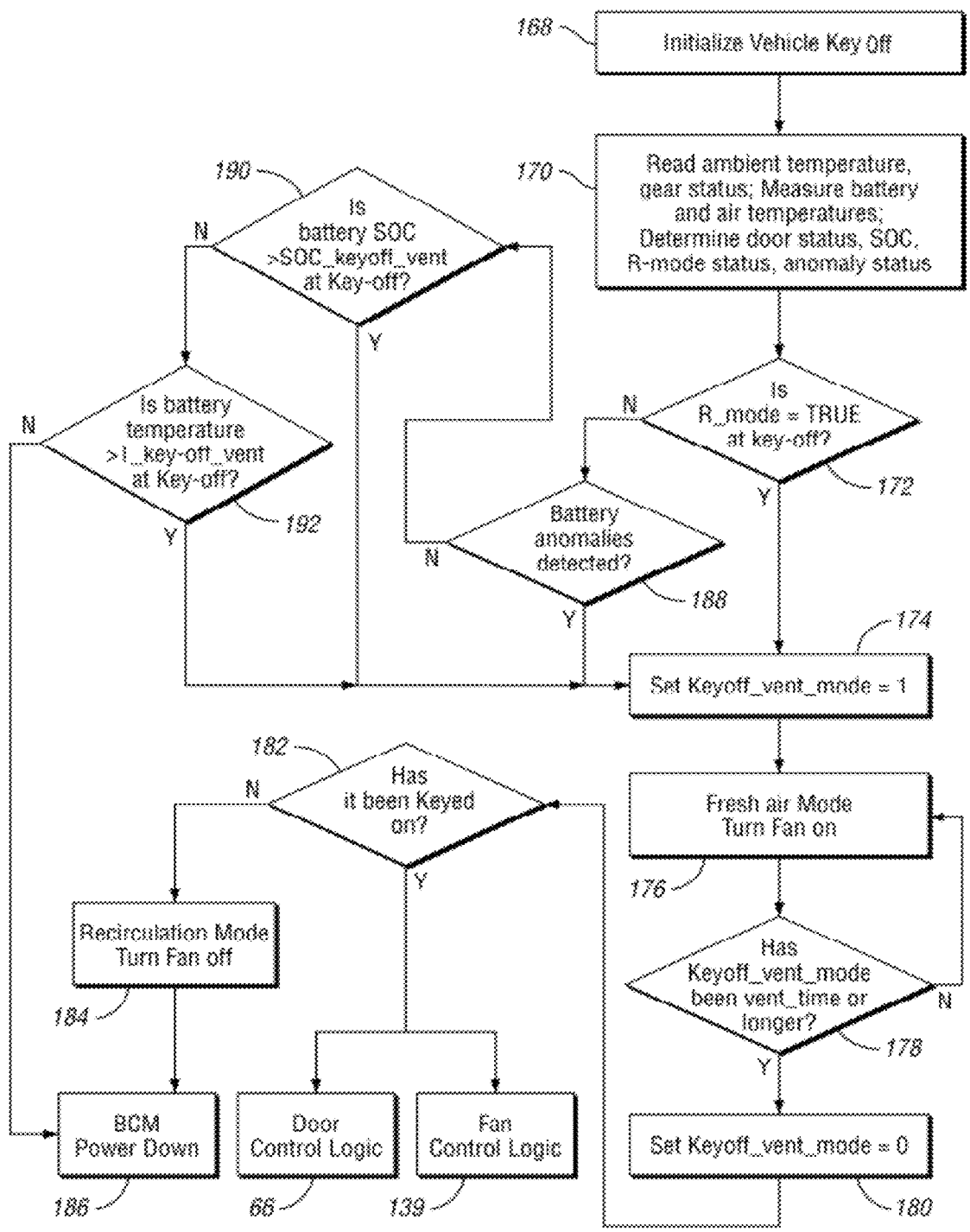
FIG. 10 is a flowchart illustrating key-off ventilation control logic in accordance with the present invention.

FIG. 6 described in detail the ventilation control logic 62, which is executed when the vehicle 16 is running—i.e., when the vehicle 16 is in a "key-on" mode. Although ventilation will be desired most often when the vehicle 16 is in the key-on mode, the environmental control system 10 also provides for ventilation when the vehicle 16 is in the "key-off" mode. FIG. 10 shows the control logic when the vehicle 16 is in the key-off mode. The control logic is initialized at step 168 when the vehicle 16 is keyed off. At step 170, a variety of parameters are determined, which may be similar, or the same, determinations that are made in step 60. At decision block 172 it is determined whether the reconditioning mode flag is on when the vehicle 16 was keyed off. If it was, a key-off ventilation flag is turned on at step 174 (Keyoff_vent_mode=1). At step 176, the environmental control system 10 is placed in the fresh air mode, including turning on the fan 28.

The battery environment is ventilated for some predetermined time (Vent-time), as shown by decision block 178. Until this predetermined time has elapsed, the key-off ventilation control logic loops back to step 176. When the time has elapsed, the key-off ventilation flag is turned off at step 180 (Keyoff_vent_mode=0), and it is then determined whether the vehicle 16 has been keyed on—see decision block 182. If not, the environmental control system 10 is set to the recirculation mode at step 184. The BCM 46 is then powered down at step 186. If, at decision block 182, it is determined that the vehicle 16 has been keyed on, the door control logic 66 and the fan control logic 139 are executed.

Returning to decision block 172, if it is determined that the reconditioning flag is not turned on when the vehicle 16 is keyed off, it is next determined at decision block 188 whether the certain battery anomalies exist. If they do, the key-off ventilation control logic returns to step 174. If, however, the battery anomalies are not detected, it is then determined at decision block 190 whether the battery SOC is greater than some predetermined SOC (SOC_keyoff_vent) required to initiate ventilation at the time the vehicle 16 is keyed off. If it is, the key-off ventilation control logic again returns to step 174. If it is not, it is then determined at decision block 192 whether the battery temperature is greater than some predetermined ventilation temperature (T_keyoff_vent) at the time the vehicle 16 is keyed off. If it is, the key-off ventilation control logic again returns to step 174. If it is not, the BCM 46 is powered down at step 186.

While the best mode for carrying out the invention has been described in detail, those familiar with the art to which this invention relates will recognize various alternative designs and embodiments for practicing the invention as defined by the following claims.

What is claimed is:

1. A method for controlling an environment for a battery in a vehicle, the vehicle including a transmission and an air conditioning system for the battery, the method comprising:

executing a first battery environment control strategy, including determining at least one vehicle operating condition;

ventilating the battery environment with air from an ambient environment outside the vehicle when the execution of the first battery environment control strategy indicates that the battery environment requires ventilation;

executing a second battery environment control strategy when the first battery environment control strategy does not indicate that the battery environment requires ventilation, the second battery environment control strategy including at least one of determining a transmission gear and determining whether the battery air conditioning system is operating;

recirculating air around the battery when the second battery control strategy indicates that exchange of air from around the battery with air from the ambient environment outside the vehicle should be inhibited; and executing a third battery environment control strategy when the second battery environment control strategy does not indicate that the exchange of air from around the battery with air from the ambient environment outside the vehicle should be inhibited, the execution of the third battery environment control strategy including determining a temperature of the battery and a temperature of the ambient environment outside the vehicle, and effecting a battery environment control based at least in part on the temperature of the battery and the temperature of the ambient environment outside the vehicle.

2. The method of claim 1, wherein the third battery environment control strategy further includes:
   determining a temperature difference between the temperature of the battery and the temperature of the ambient environment outside the vehicle; and
   cooling the battery environment with air from the ambient environment outside the vehicle when the temperature of the battery is greater than a first predetermined temperature and the temperature difference is greater than a second predetermined temperature.

3. The method of claim 1, wherein determining the at least one vehicle operating condition includes at least one of determining whether the battery is in a reconditioning state, whether one or more anomalies exist in the battery, and whether the battery state of charge is greater than a first predetermined charge level.

4. The method of claim 3, wherein execution of the first battery environment control strategy indicates that the battery environment requires ventilation when the battery state of charge is greater than a first predetermined charge level.

5. The method of claim 3, wherein execution of the second battery environment control strategy further includes determining a current transmission gear, and recirculating air around the battery when it is determined that the transmission is in a park or neutral gear.

6. The method of claim 3, wherein execution of the second battery environment control strategy further includes determining whether the battery air conditioning system is operating to cool the battery, and recirculating air around the battery when it is determined that the battery air conditioning system is operating to cool the battery.

7. An environmental control system for a battery in a vehicle including a transmission, the system comprising:
   an air intake for receiving air from an ambient environment outside the vehicle;
   a duct system capable of providing communication between the air intake and the battery, the duct system including a first door movable between a first position for facilitating movement of air between the air intake and the battery, and a second position for inhibiting movement of air between the air intake and the battery;
   an air outlet configured to facilitate air flow from the duct system to the ambient environment outside the vehicle, the duct system further including a second door movable between a first position for facilitating movement of air between the battery and the air outlet, and a second position for inhibiting movement of air between the battery and the air outlet;
   a fan cooperating with the duct system for moving air through at least a portion of the duct system and across the battery; and
   a control system including at least one controller and configured to control operation of the fan and the first door, and to determine independently of temperature whether the battery environment requires ventilation, the control system being further configured to:
   command the first door into the first position and to operate the fan, thereby moving air in through the air intake, across the battery, and out through the air outlet when it is determined that the battery environment requires ventilation, and
   receive at least one signal related to the transmission gear, and to command the second door into the second position when the transmission is in a park or neutral gear and the battery environment does not require ventilation.

8. The environmental control system of claim 7, wherein the control system determination of whether the battery environment requires ventilation includes at least one of the control system determining whether the battery is in a reconditioning state, whether one or more anomalies exist in the battery, and whether the battery state of charge is greater than a first predetermined charge level.

9. The environmental control system of claim 7, the vehicle further including a battery air conditioning system, wherein the control system is further configured to determine whether the battery air conditioning system is operating to cool the battery, and to command the first and second doors into their respective second positions when the transmission is in a forward or reverse gear, the battery air conditioning system is operating to cool the battery, and the battery environment does not require ventilation.

10. The environmental control system of claim 9, further comprising:
   a sensor for determining a temperature of the battery and for sending a signal to the control system related to the battery temperature; and
   a sensor for determining a temperature of the ambient environment outside the vehicle and for sending a signal to the control system related to the temperature of the ambient environment outside the vehicle, and
   wherein the control system is further configured to:
   a) determine a first temperature difference defined as the difference between the battery temperature and the temperature of the ambient environment outside the vehicle,
   b) command the first and second doors into their respective first positions, and
   c) operate the fan, thereby moving air in through the air intake, across the battery, and out through the air outlet, when the temperature of the battery is greater than a first predetermined temperature, the first temperature difference is greater than a second predetermined temperature, the transmission is in a forward or reverse gear, and the battery air conditioning system is not operating to cool the battery.

11. The environmental control system of claim 10, wherein the control system is further configured to inhibit operation of the fan when the temperature of the battery is within a first predetermined temperature range, and the battery environment does not require ventilation.

12. The environmental control system of claim 7, wherein the duct system further includes a second door movable between a first position for facilitating movement of air between the battery and the air outlet, and a second position for inhibiting movement of air between the battery and the air outlet, wherein the control system is further configured to:
   a) receive at least one signal indicating whether the vehicle is in a key-off mode,
   b) command the first and second doors into their respective first positions and operate the fan for a predetermined time, thereby moving air in through the air intake, across the battery, and out through the air outlet, when it is determined that the battery environment requires ventilation and the vehicle is in the key-off mode, and
   c) command the first and second doors into their respective second positions and stop operation of the fan when the predetermined time has elapsed.

* * * * *